United States Patent [19]

Miller

[11] Patent Number: 4,467,468
[45] Date of Patent: Aug. 21, 1984

[54] OPTICAL COMMUNICATION SYSTEM

[75] Inventor: Stewart E. Miller, Locust, N.J.

[73] Assignee: AT&T Bell Laboratories, Murray Hill, N.J.

[21] Appl. No.: 334,908

[22] Filed: Dec. 28, 1981

[51] Int. Cl.³ .............................................. H04B 9/00
[52] U.S. Cl. ......................................... 370/3; 370/4
[58] Field of Search ..................... 370/1, 2, 3, 4, 6, 50

[56] References Cited

U.S. PATENT DOCUMENTS

| 3,399,278 | 8/1968 | Dahlman | 370/50 |
| 3,471,646 | 10/1969 | Magnuski et al. | 370/50 |
| 3,633,034 | 1/1972 | Uchida | 370/3 |
| 4,267,590 | 5/1981 | Bosotti | 370/3 |
| 4,406,003 | 9/1983 | Eberly et al. | 370/3 |

FOREIGN PATENT DOCUMENTS 111339  9/1981  Japan ....................................... 370/3

OTHER PUBLICATIONS

Ishikawa et al., "Multireflection Wavelength Division Multiplexers", Cont. 6th European Conf. on Optical Comm., York, England, Sep. 16-19, 1980, pp. 298-301.
Stewart E. Miller, "Overview of Telecommunications Via Optical Fibers" Proc. of IEEE, vol. 68, No. 10, pp. 1173, 1174, Oct. 1980.
Copeland et al., "Triggerable Semiconductor Lasers" IEEE Journal of Quantum Elec., vol. QE16, No. 4, Apr. 1980, pp. 388-390.
"Dual Wavelength Surface Emitting InGaAsP L.E.D.S" Electronics Letters, Oct. 23rd 1980, vol. 16, No. 22, pp. 845-846.
Campbell et al., "Improved Two-Wavelength Demultiplexing InGaAsP Photodetector" IEEE Journal of Quantum Electronics, vol. QE-16, No. 6, Jun. 1980-pp. 601-603.

Primary Examiner—Joseph A. Orsino, Jr.
Attorney, Agent, or Firm—Sylvan Sherman; David R. Padnes

[57] ABSTRACT

A new transmission system configuration is disclosed which takes advantage of the special properties of lightwave devices and the extensive availability of frequency space on optical fibers. The system employs a combination of time and frequency multiplexing at the transmitter, and frequency demultiplexing at the receiver. An advantageous result of combining time and frequency multiplexing is to relax the tolerance requirements on filters at the transmitter. A further advantage is to minimize the effects of mode dispersion introduced by the fiber.

5 Claims, 7 Drawing Figures

TRANSMITTED SIGNAL

RECEIVED SIGNAL

OUTPUT SIGNALS

OPTICAL COMMUNICATION SYSTEM

TECHNICAL FIELD

This application relates to optical communication systems.

BACKGROUND OF THE INVENTION

Lightwave telecommunication systems using glass fiber guides are now being manufactured and installed on a regular commercial basis. To reach this point required the development and harmonious combination of light sources, light guides and light detectors. For a review of this process see, for example, the article by S. E. Miller entitled "Overview of Telecommunications Via Optical Fibers," published in the October 1980 *Proc. of the IEEE*, Vol. 68, No. 10, pp. 1173-1174.

As this initial era of experimental and trial installations ends, we look forward to the need to send more information over each fiber. This effort will involve a further development of new components and, in accordance with the present invention, more efficient use of currently available components.

SUMMARY OF THE INVENTION

An optical communication system in accordance with the present invention employs a combination of time and wavelength multiplexing at the transmitter, and wavelength demultiplexing at the receiver. The transmitter comprises a plurality of lasers or LEDs, each generating a series of short pulses of light at a different operating wavelength. The modulation method employed can be pulse amplitude, pulse width, pulse position or any other type of pulse modulation. These pulses are time-multiplexed for transmission over a common fiber wavepath. At the receiver, a wavelength demultiplexer recovers the original signals.

It is an advantage of the present invention that pulse spreading due, for example, to mode dispersion is not a limitation in such a system inasmuch as adjacent, overlapping pulses are at different wavelengths and readily resolved at the receiver. These and other advantages of the system will become apparent in the detailed description of the invention given hereinbelow.

DETAILED DESCRIPTION

Figure 1:
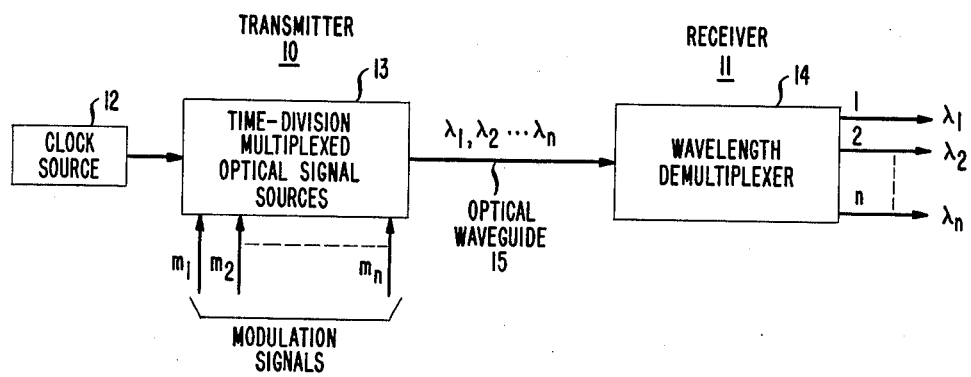
FIG. 1 shows, in block diagram, an optical communication system in accordance with the invention.

Referring to the drawings, FIG. 1 shows, in block diagram, an optical communication system in accordance with the present invention comprising, a transmitter 10 including a plurality of time-division multiplexed optical signal sources 13 and a receiver 11 including a wavelength demultiplexer 14. The transmitter and receiver are connected together by means of an optical waveguide 15.

In operation, each of the optical signal sources at the transmitter is modulated by means of a separate modulation signal, $m_1, m_2 \ldots m_n$, to produce a train of optical pulses at one of a plurality of different wavelengths $\lambda_1, \lambda_2, \ldots \lambda_n$. The several signals are time-division multiplexed by means controlled by a timing signal derived from a clock source 12 for transmission along a common waveguide 15. At the receiver, the several signals are recovered by the wavelength demultiplex 14 and appear at the demultiplexer outputs 1, 2, ... n.

Figure 2:
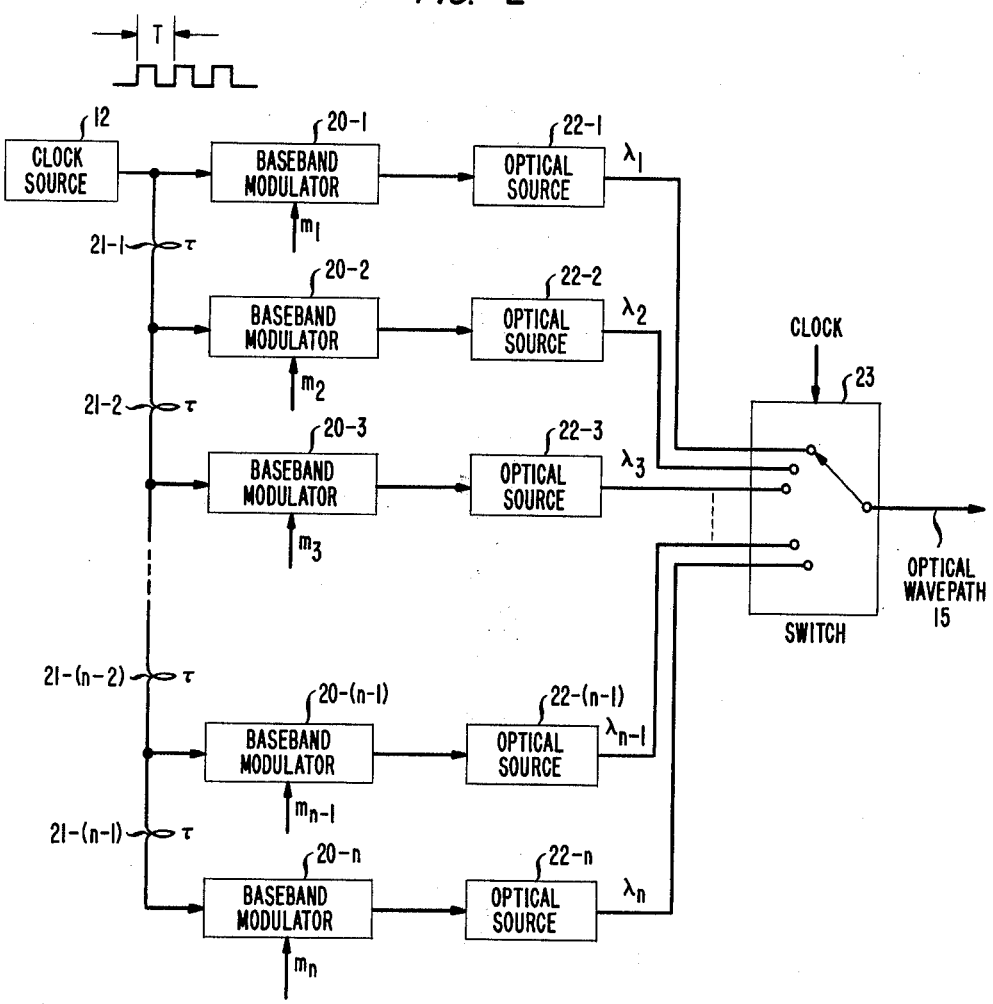
FIG. 2 shows an illustrative transmitter arrangement for practicing the invention.

FIG. 2 shows an illustrative transmitter arrangement for practicing the present invention. Typically, the transmitter includes a clock source 12 whose output is a pulse train having a pulse repetition rate equal to 1/nth the bit rate of the signal to be transmitted along optical wavepath 15, where n is equal to the number of channels to be multiplexed. The pulses are coupled to a plurality of baseband signal modulators 20-1, 20-2 ... 20-n along with modulation signals $m_1, m_2 \ldots m_n$. More particularly, the clock pulse train is applied directly to the first modulator 20-1, and to successive modulators through delay lines 21-1, 21-2 ... 21-(n−1), each of which provides a delay $\tau$ to the clock pulses where $$\tau = (T/n),$$

and T is the clock pulse period. Thus, the clock pulses applied to any modulator 20-i are delayed a period of time $\tau(i-1)$ relative to the clock pulses applied to the first modulator 20-1, where i is any integer such that $1 < i \leq n$.

The outputs from the several modulators are, in turn, applied, respectively, to optical signal sources 22-1, 22-2 ... 22-n, each of which is tuned to a different wavelength $\lambda_1, \lambda_2 \ldots \lambda_n$. The optical sources can be triggerable semiconductor lasers of the type described, for example, in the article entitled "Triggerable Semiconductor Lasers" by J. A. Copeland et al., published in the April 1980 issue of the *IEEE Journal of Quantum Electronics*, Vol. QE-16, No. 4, pp. 388-390. Alternatively, dual wavelength LEDs can be employed where the two LEDs are energized sequentially. (See, "Dual Wavelength Surface Emitting In GaAsP L.E.D.S." by T. P. Lee et al., published in *Electronic Letters*, Oct. 25, 1980, Vol. 16, No. 22, pp. 845-546.)

Whatever the nature of the source, each will generate an optical pulse train at an optical wavelength that is different than the wavelength of all the other optical signals and is displaced in time relative to all the other optical pulse trains. These are then combined in the common optical wavepath 15 by means of a switch 23. The resulting signal is a time-division multiplexed signal in which adjacent pulses have different wavelengths.

Figure 3:
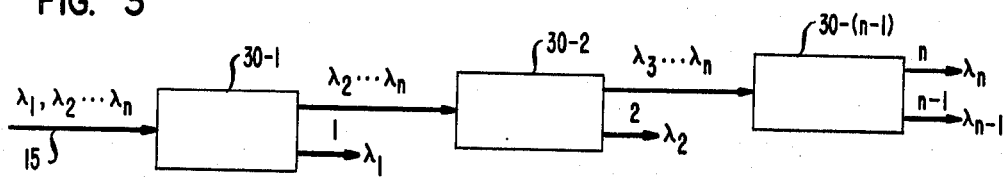
FIG. 3 shows a wavelength demultiplexer comprising a cascade of wavelength selective filters.
Figure 4:
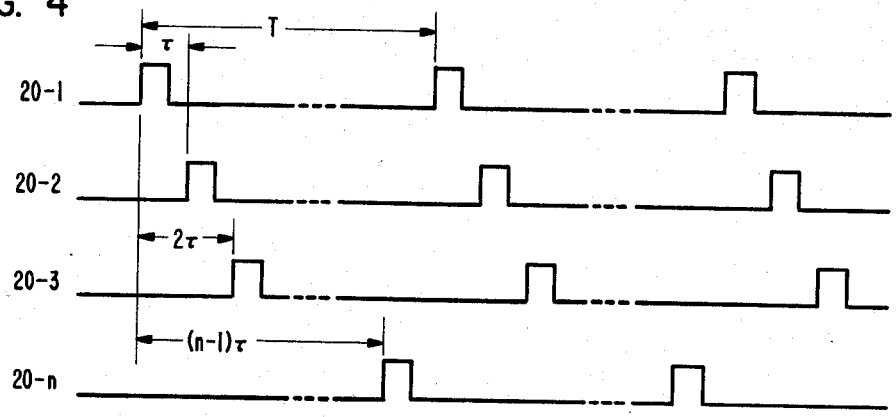
FIGS. 4, 5, 6 and 7 included for purposes of explanation, show the signals at various locations in the system.
Figure 5:
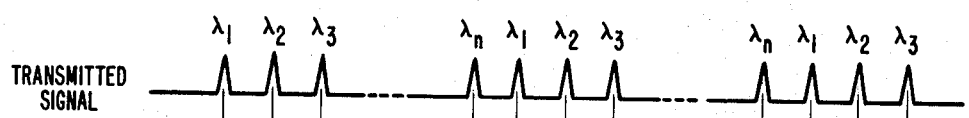

At the receiver, a wavelength demultiplexer comprising a plurality of n−1 wavelength selective filters 30-1, 30-2 ... 30-(n−1), is connected in cascade as illustrated in FIG. 3. These separate the different wavelength optical signals for transmission along separate signal paths 1, 2 ... n. The filters can be the type disclosed by R. C. Alferness in application Ser. No. 245,626 filed Mar. 19, 1981, or the type described by E. A. J. Marcatili in his application Ser. No. 313,603, filed Oct. 21, 1981, both of which are assigned to applicant's assignee.

In an alternative receiver arrangement, the number of wavelength filters can be halved by the use of dual wavelength detectors of the type described by J. C. Campbell et al. in their article entitled "Improved Two-Wavelength Demultiplexing In GaAsP Photodetector," published in the *IEEE Journal of Quantum Electronics*, Vol. QE-16, No. 6, June 1980, pp. 601-603.

Figure 6:
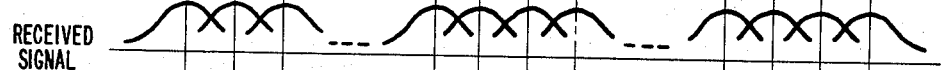
Figure 7:
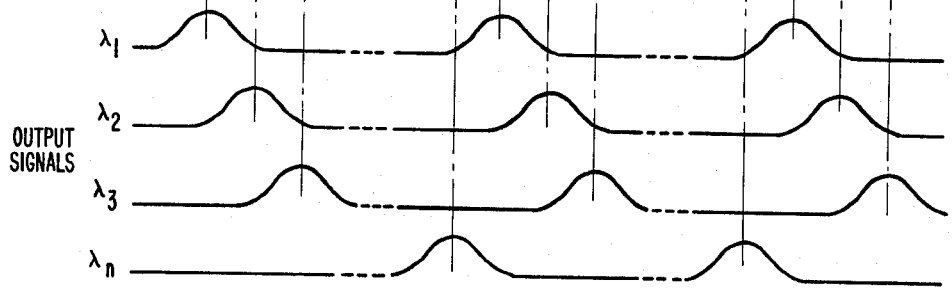

FIGS. 4, 5, 6 and 7 included for purposes of explanation, show, respectively, the clock pulse trains applied to the several modulators, the transmitted and the received, time-division multiplexed optical pulse trains, and the demultiplexed received signals. FIGS. 6 and 7, in particular, clearly illustrate one of the principal advantages of the invention. As is known, dispersion of various kinds tends to broaden the signal pulses. The longer the transmission line, the greater the pulse broadening, and, indeed, it is the latter that effectively limits the pulse bit rate and/or the distance between regenerators in an optical communication system. However, by providing wavelength multiplexing as well as time-division multiplexing, the overlap among adjacent pulses does not limit the ability of the receiver to resolve the resulting ambiguity that can occur in a simple time-division multiplexed system. Here, the pulses are readily resolved at the receiver by the wavelength selective filters and the original signals easily recovered. As a result, the bit rate and separation between regenerators can be significantly increased.

While these same results can be accomplished by wavelength multiplexing alone, this would require the use of wavelength-selective filters at the transmitter in order to combine the outputs of the separately modulated sources, as well as wavelength-selective filters at the receiver to then separate the several signals. In the optical region it is far simpler and more practical to provide time-division multiplexing at the transmitter, with no wavelength selectivity. This is particularly advantageous in view of the availability of the above-described dual wavelength sources having two emission wavelengths and a single output which reduces the cost of the transmitter.

What is claimed is:
1. An optical communication system comprising
   n signal sources, where n is a number of at least three, each source generating an output pulse train at a different wavelength, and the pulses in any one of the generated pulse trains are never time coincident with the pulses in any other generated pulse train;
   means for time-division multiplexing the generated pulse trains from said sources onto an optical fiber; and
   receiver means coupled to said fiber for separating the output pulses according to the generating signal source solely by wavelength-division demultiplexing the received signal, said receiver means comprising wavelength selective filters connected in cascade.

2. The system of claim 1 wherein said signal sources are responsive to clock signals having a preselected clock period and wherein the clock signal supplied to any one of said sources is displaced in time relative to the clock signal supplied to any other one of said sources by an amount equal to an integer multiple of said period divided by n.

3. The communication system of claim 1 including means for modulating said signal sources.

4. The system according to claim 1 wherein said signal sources are optical signal sources, and said transmission medium is an optical fiber.

5. The system according to claim 4 wherein the output signal from said time-division multiplexing means is a sequence of optical pulses each of which has a wavelength that is different than the wavelength of the next adjacent pulses.

* * * * *